A. C. GAYNOR.
SWINGING TIRE HOLDER.
APPLICATION FILED DEC. 13, 1909.
964,153.
Patented July 12, 1910.
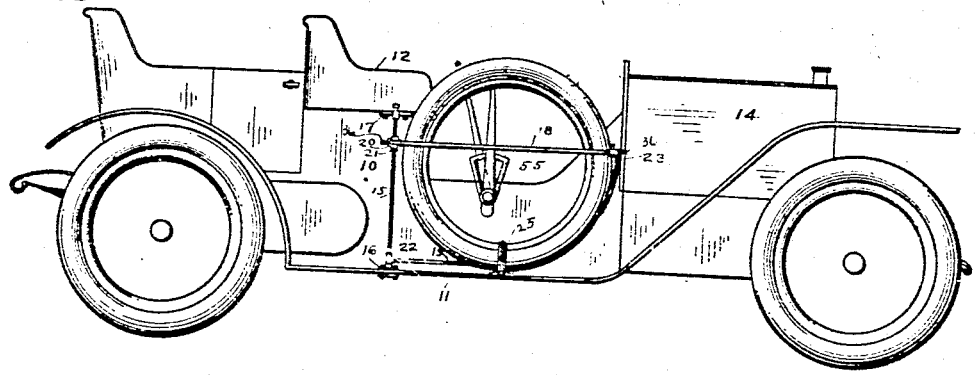
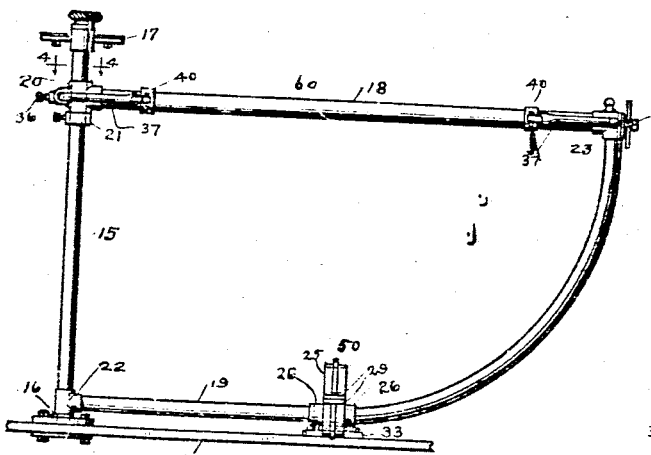
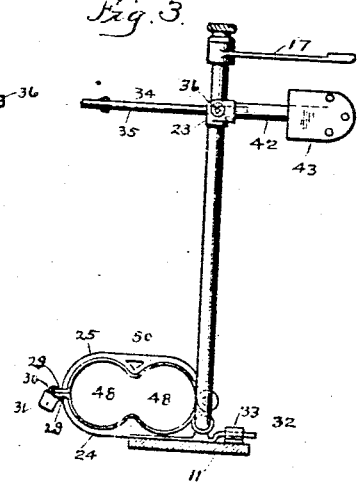
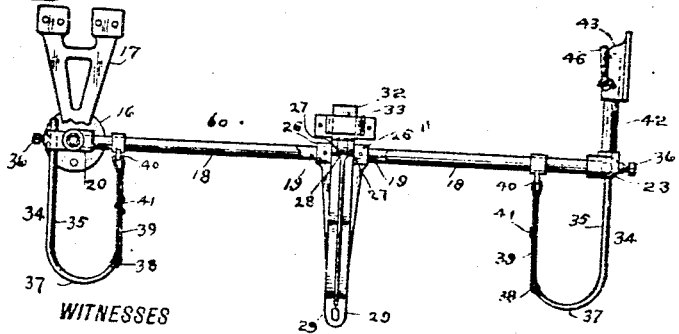
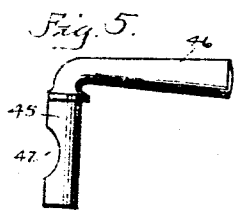
WITNESSES
Ernst P. Vold
S. W. Atherton
INVENTOR
Arthur C. Gaynor
BY
ATTORNEY

UNITED STATES PATENT OFFICE.

ARTHUR C. GAYNOR, OF BRIDGEPORT, CONNECTICUT.

SWINGING TIRE-HOLDER.

964,153.   Specification of Letters Patent.   Patented July 12, 1910.

Application filed December 13, 1909. Serial No. 532,822.

*To all whom it may concern:*

Be it known that I, ARTHUR C. GAYNOR, a citizen of the United States, residing at Bridgeport, county of Fairfield, State of Connecticut, have invented an Improvement in Swinging Tire-Holders, of which the following is a specification.

This invention has for its object to provide a swinging tire holder for motor cars which will operate like a swinging gate and give convenient access to the car on the driver's side. It is of course well understood that in ordinary open cars one or more extra tires are carried on the driver's side of the car, said tire or tires being ordinarily placed in a vertical position above the running board and between the driver's seat and the engine hood. The carrying of an extra tire in this manner makes it difficult to enter the car upon that side and makes it necessary to remove the tire to obtain access to a gas tank, generator, battery, siren motor or any adjunct or appendage of the machine that may be carried upon the running board. My present invention wholly obviates these difficulties and makes it perfectly convenient for the driver to enter the car upon that side and also gives convenient access to any of the adjuncts of the car that may be placed upon the running board without removing the extra tire but by simply swinging the holder and with it the tire or tires to the open position like a gate. With these and other objects in view I have devised the novel swinging tire holder which I will now describe, referring to the accompanying drawing forming a part of this specification and using reference characters to indicate the several parts.

Figure 1 is an elevation illustrating the application of my novel tire holder to a motor car, a tire being shown in place in the holder; Fig. 2 a side elevation on an enlarged scale of the holder detached, the tire being removed; Fig. 3 an end elevation as seen from the right in Fig. 2; Fig. 4 a plan view of the holder detached, the standard being in section on the line 4—4 in Fig. 2 looking down; and Figs. 5 and 6 are detail views illustrating a form of latch which may be employed to retain the holder in the closed position.

10 denotes the body of a motor car, 11 the running board, 12 the driver's seat, 13 the dashboard and 14 the engine hood, it being understood of course that my invention is not limited to any special style or type of car but is applicable to all styles of cars upon which it is desirable to carry an extra tire above the running board.

My novel tire holder consists simply of a suitable frame so pivoted to the body of the car as to enable it to swing over the running board and into alinement with the opening, indicated by 55, between the driver's seat and the engine hood or the dashboard, and provided with suitable means for retaining either one or two tires in place thereon. To this may be added suitable means for retaining the holder in the closed position. It is wholly immaterial, so far as the principle of the invention is concerned, how the holder is constructed. In the drawing I have illustrated a form of holder constructed from pieces of tubing and the necessary hubs or joints.

15 denotes a standard which may be secured in any suitable manner to the running board and to the body of the car. In the present instance I have shown the lower end of the standard as seated in a base piece 16 which is bolted to the running board and the upper end as secured to a bracket 17 which is secured to the car. In the present instance I have shown it as bolted to the under side of the overhang of the seat.

60 denotes the holder as a whole, shown in the present instance as comprising simply an upper bar 18 which is pivoted upon the standard near its upper end and a lower bar 19 which is pivoted upon the standard near its lower end and is curved upward and connected to the outer end of the upper bar. In the present instance the inner end of the upper bar engages a hub 20 which turns freely on the standard and rests upon a collar 21 which is secured to the standard. The inner end of the lower bar engages a hub 22 which turns freely on the standard and rests upon the base piece. The outer ends of both the upper and lower bars engage a hub 23. At approximately the midlength of the lower bar and near the end of the horizontal portion thereof I provide a clip 50 comprising a lower or fixed jaw 24 and an upper or swinging jaw 25. Each of these jaws is provided with preferably two half sockets which together form sockets 48 to receive and retain tires. The lower jaw is provided with a hub 26 which is rigidly secured to the lower bar 19 and is provided with ears 27 between which an ear 28 on the upper jaw is pivoted. The forward ends of the jaws are provided with outwardly extending ears 29 which are provided with holes through which the hasp 30 of a padlock 31 may be passed to lock the tires against removal. The rear end of the lower jaw is shown as provided with a tongue 32 which enters a keeper 33 upon the running board and braces and supports the holder in the closed position. In addition to clip 23 I provide at each end of the upper bar sliding clips 34 which are adapted to retain either one or two tires. Each of these clips comprises a rod 35 which is adapted to slide respectively in hubs 20 and 23 and is locked in place after adjustment by a set screw 36. The outer end of each rod 35 is curved as at 37 to inclose a tire and is provided with an eye 38 through which a strap 39 passes, each strap passing through an eye 40 on the upper bar and being provided with a buckle 41.

It will readily be seen that by loosening the set screws the rods may be moved in or out so as to grip either one or two tires lying side by side, after which the rods are locked in place by the set screws and the tire or tires are held in place by tightening up the straps. In the drawing I have shown hub 23 as provided with an inwardly extending tube 42 which is adapted to pass into a keeper 43 which is secured to any convenient portion of the car, in the present instance to the dashboard. The rod 35 of the corresponding sliding clip passes within this tube. The tube is provided in one side with a recess 44 and the keeper is provided with an oscillating latch 45 having a hand piece 46 and a recess 47 which is adapted to register in the unlocking position with recess 44 in the tube so as to permit the tube to pass in and out of the keeper freely. To lock the holder in the closed position it is swung inward and tube 42 passed into the keeper until it engages the inner wall thereof and the latch is turned to place recess 47 out of alinement with recess 44 in the tube and a solid portion of the latch in engagement with said recess 44.

The operation of the holder will be obvious from the drawing and description. The tires are placed in the clips in the manner described and may be locked there by the use of a padlock in clip 50. To enable the driver or a passenger to enter the car from the driver's side or in order to obtain access to a gas tank, generator, battery, siren motor or other adjunct of the car upon or above the running board, the latch is turned to place recesses 44 and 47 in alinement which releases the holder and permits it to be swung open like a gate. When swung back to the closed position it is locked there by turning the latch sufficiently to place the notches out of alinement and a solid portion of the latch in alinement with the recess in the tube.

Having thus described my invention I claim:

1. A device of the character described comprising a holder having a locking projection, means for pivotally supporting said holder, tire securing means carried by said holder, and an oscillating latch member provided with a stem, said locking projection and said stem being provided with recesses adapted to coincide.

2. A device of the character described comprising a holder, means for pivotally supporting the same, adjustable tire securing means carried by said holder, a locking tube carried by said holder and coöperating with said tire holding means, a keeper to receive the same, and an oscillating latch mounted in said keeper, said tube and latch being provided with recesses which are adapted to coincide.

3. A swinging tire holder comprising an upper bar and tire securing clips secured thereto, each clip comprising a rod having one end adjustably connected with said bar, means for adjustably connecting the other end of said rod with said bar, a locking tube into which the first mentioned end protrudes, and locking means for engaging said tube.

4. A swinging tire holder comprising an upper bar, a lower bar curved at one end, means for uniting one end of said upper bar with the curved end of the lower bar, a standard to which the other ends of both bars are pivotally connected, tire engaging devices carried by both bars, and a locking device for engaging said bars at their point of union.

5. A swinging tire holder comprising an upper bar, a lower bar curved at one end, means for uniting one end of said upper bar with the curved end of the lower bar, a standard to which the other ends of both bars are pivotally connected, tire engaging devices carried by the upper bar, a tire securing clip carried by the lower bar and provided with a tongue, and a keeper for said tongue.

6. A swinging tire holder comprising an upper bar, a lower bar curved at one end, a hub uniting one end of the upper bar with the curved end of the lower bar, means for pivotally supporting the other ends of said bars, tire engaging devices carried by both bars, a locking tube projecting from said hub, and a latch for engaging said tube.

In testimony whereof I affix my signature in presence of two witnesses.

ARTHUR C. GAYNOR.

Witnesses:
A. M. WOOSTER,
S. W. ATHERTON.